(12) United States Patent
Steele (10) Patent No.: US 9,527,272 B2
(45) Date of Patent: Dec. 27, 2016

(54) METHOD FOR PRINTING A THREE-DIMENSIONAL OBJECT

(71) Applicant: William Joseph Steele, Lawrenceburg, IN (US)

(72) Inventor: William Joseph Steele, Lawrenceburg, IN (US)

(73) Assignee: Polar 3D LLC, Cincinnati, OH (US)

( * ) Notice: Subject to any disclaimer, the term of this patent is extended or adjusted under 35 U.S.C. 154(b) by 342 days.

(21) Appl. No.: 14/200,253

(22) Filed: Mar. 7, 2014

(65) Prior Publication Data

US 2015/0251360 A1 Sep. 10, 2015

(51) Int. Cl.
| | | |
|---|---|---|
| B29C 41/02 | (2006.01) | |
| B29C 41/52 | (2006.01) | |
| G05B 19/416 | (2006.01) | |
| B33Y 50/02 | (2015.01) | |
| B29C 67/00 | (2006.01) | |
| B33Y 10/00 | (2015.01) | |
| B33Y 30/00 | (2015.01) | |

(52) U.S. Cl.
CPC ............ B33Y 50/02 (2014.12); B29C 67/0055 (2013.01); B29C 67/0059 (2013.01); B29C 67/0081 (2013.01); B29C 67/0088 (2013.01); B33Y 10/00 (2014.12); B33Y 30/00 (2014.12)

(58) Field of Classification Search
CPC ...... B29C 41/02; B29C 41/52; B29C 67/0055; B29C 67/0059; B29C 67/0081; B29C 67/0088; G05B 19/416
USPC ...... 264/40.1, 40.7, 308, 310, 406; 318/626, 318/648
See application file for complete search history.

(56) References Cited

U.S. PATENT DOCUMENTS

| | | | |
|---|---|---|---|
| 6,877,837 B1 * | 4/2005 | Igarashi | G05B 19/4163 318/626 X |
| 7,686,995 B2 | 3/2010 | Davidson et al. | |
| 7,819,055 B2 | 10/2010 | Tezuka et al. | |
| 8,017,055 B2 | 9/2011 | Davidson et al. | |
| 8,104,856 B2 | 1/2012 | Tezuka et al. | |
| 8,119,053 B1 * | 2/2012 | Bedal | B29C 67/0077 264/308 |
| 8,778,252 B2 | 7/2014 | Mackie et al. | |
| 8,827,684 B1 * | 9/2014 | Schumacher | B29C 67/0055 264/308 |
| 2004/0265413 A1 | 12/2004 | Russell et al. | |
| 2008/0042321 A1 | 2/2008 | Russell et al. | |
| 2012/0165969 A1 | 6/2012 | Elsey | |
| 2014/0265034 A1 | 9/2014 | Dudley | |

FOREIGN PATENT DOCUMENTS

| | | | | |
|---|---|---|---|---|
| JP | 2009175273 A | * | 8/2009 | G04G 21/00 |
| WO | 2014092651 A1 | | 6/2014 | |

OTHER PUBLICATIONS

International Search Report and Written Opinion dated Jun. 3, 2015, for corresponding International Application No. PCT/US2015/19199, filed Mar. 6, 2015 (8 pages).

* cited by examiner

Primary Examiner — Leo B Tentoni
(74) Attorney, Agent, or Firm — Hasse & Nesbitt LLC; Daniel F. Nesbitt (57) ABSTRACT

A method for printing a three dimensional object comprising providing a support structure, rotating a build platform having a center and disposed on the support structure, slideably moving the build platform disposed on the support structure, and printing an object on the build platform with a print head.

15 Claims, 7 Drawing Sheets

METHOD FOR PRINTING A THREE-DIMENSIONAL OBJECT

FIELD OF THE INVENTION

This invention related generally to a three dimensional printer having a build platform that is rotatable and slideable. This invention also relates to methods of printing three dimensional objects with a three dimensional printer having a build platform that is rotatable and slideable.

BACKGROUND OF THE INVENTION

Three dimensional printers use the additive process to build a three-dimensional solid object from a digital model. Unlike traditional machining techniques which typically rely on the removal of material to generate an object, the additive process lays down successive layers of materials to build an object. Three dimensional printers can be used for rapid prototyping, small production runs, custom fabrication, and various other uses.

Software takes a virtual model of an object to be built and slices the model into digital cross sections. The digital cross sections are fed to the three dimensional printer, which lays down each successive layer, ultimately resulting in a completed three dimensional object of the virtual model.

Three dimensional printers can move the print head relative to the build platform on which the material is deposited or formed in a variety of ways. In one method, a print head is driven in the x, y, and z direction as material is deposed on a build platform. In another method, a print head is driven in the x and y direction with the build platform moving in the z direction. In another method, the build platform is moved in the x and y direction and the print head is moved in the z direction. In yet another method, the build platform is moved in the x, y, and z direction. Finally, in a polar coordinates system the build platform is rotated and the coordinates for placement of the material is determined by an angle from a predetermined line and a radius from a fixed point.

Presented here is an invention in which utilizes a rotating build platform that also translates in the x direction.

SUMMARY OF THE INVENTION

This invention relates to a printer for printing a three-dimensional object comprising a support structure, a rotatable build platform slideably disposed on the support structure, and a print bead disposed above the rotatable build platform.

This invention further relates to a method for printing a three dimensional object comprising providing a support structure, rotating a build platform having a center and disposed on the support structure, slideably moving the build platform disposed on the support structure, and printing an object on the build platform with a print head.

This invention also relates to a method of controlling a driver for printing a three-dimensional object comprising providing a three dimensional printer having a build platform and a driver for driving the build platform, calculating the inertia at a first predetermined time into the printing process of an object to be printed on the build platform, and setting the drive current for the driver for the time up to the first predetermined time based on the inertia at the first predetermined time.

DETAILED DESCRIPTION OF THE INVENTION

Figure 1:
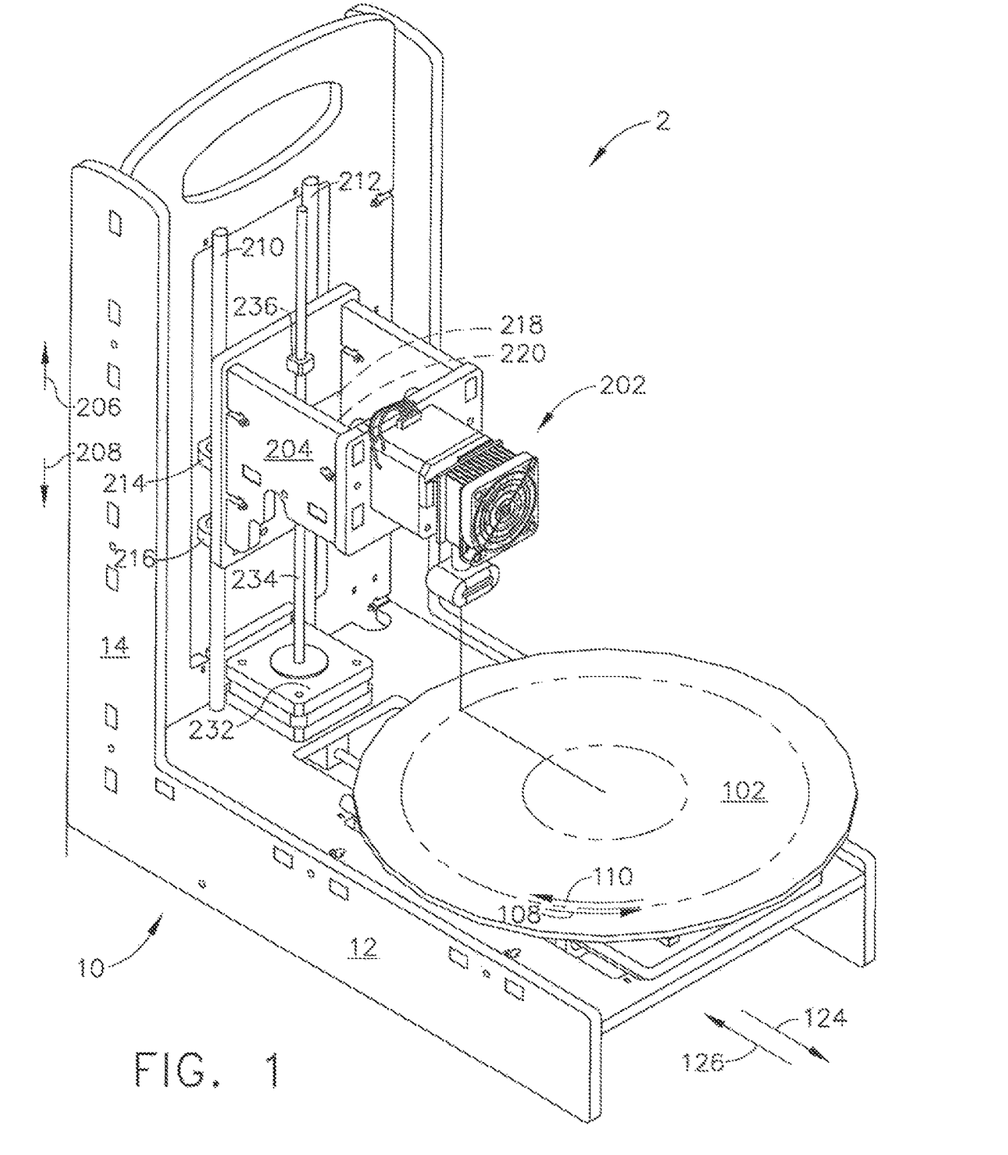
FIG. 1 shows a perspective view of a three dimensional printer of the invention with a build plate in a forward position.

Shown in FIG. 1 is a three dimensional printing apparatus 2 having a support structure 10 comprising a horizontal section 12 and a vertical section 14. Slideably disposed on the support structure 10 is a rotatable build platform 102. A print head 202 is disposed above the rotatable build platform 102. The horizontal section 12 of the support structure 10 has linear guide shafts 16, 18 for slideably supporting the rotatable build platform.

Figure 2:
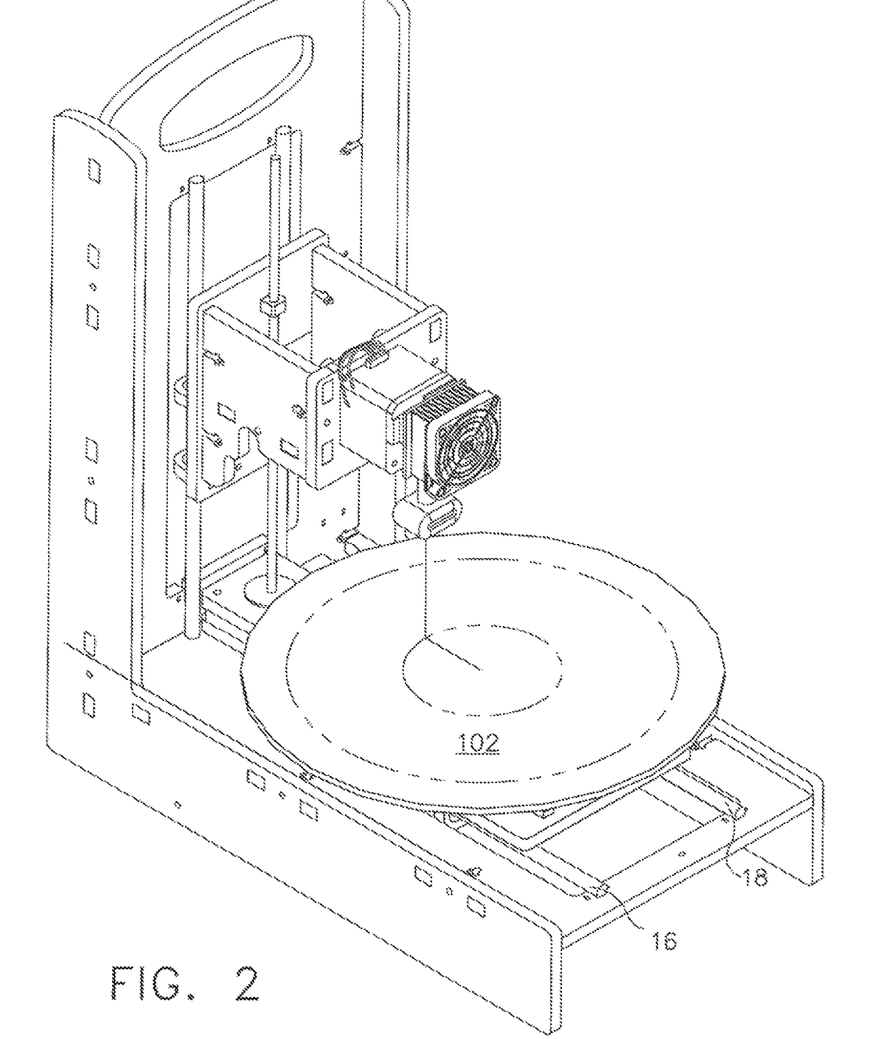
FIG. 2 shows a perspective view of the three dimensional printer of FIG. 1 with the build plate in a rearward position.
Figure 3:
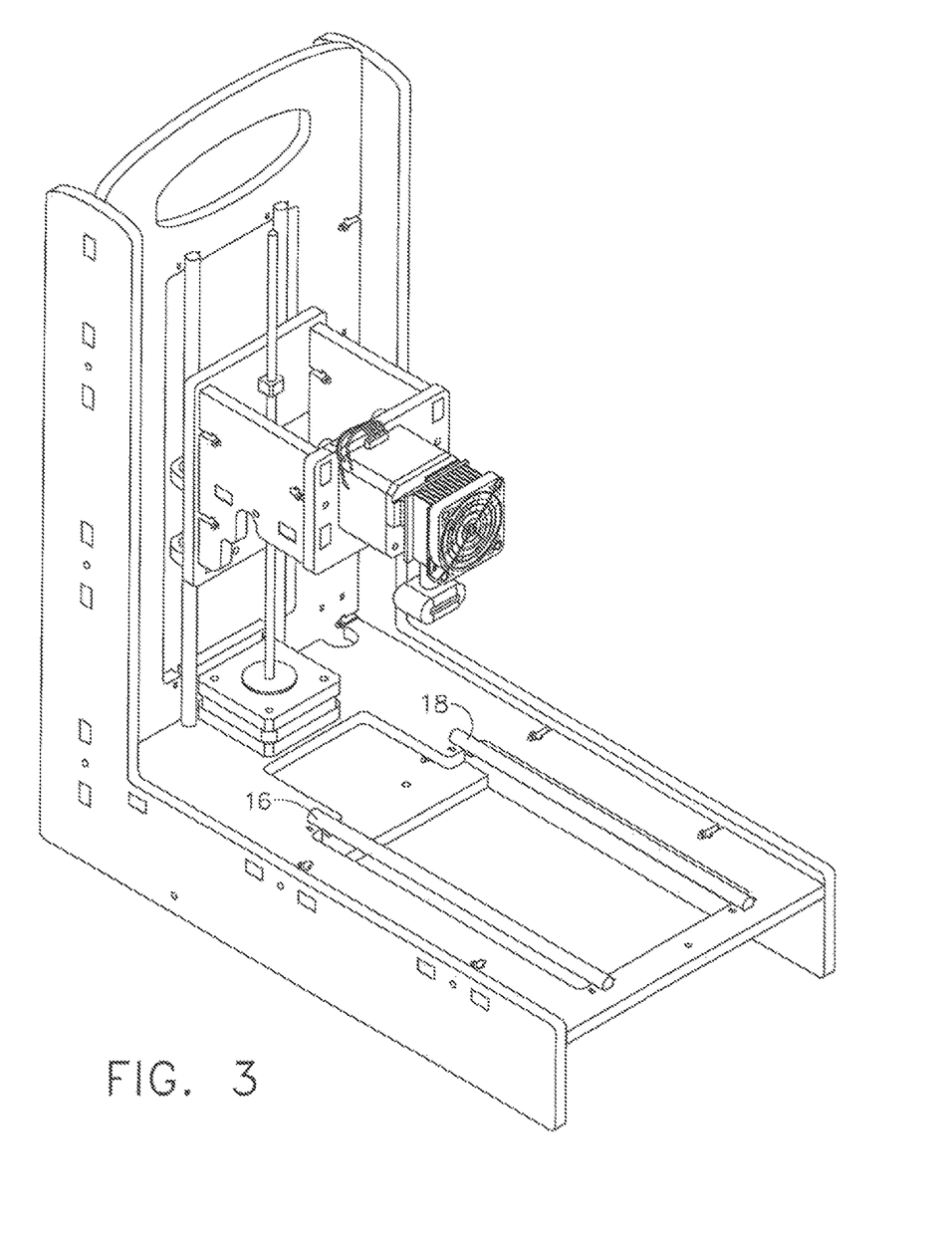
FIG. 3 shows a perspective view of the three dimensional printer of FIG. 1 with the build plate frame removed.
Figure 4:
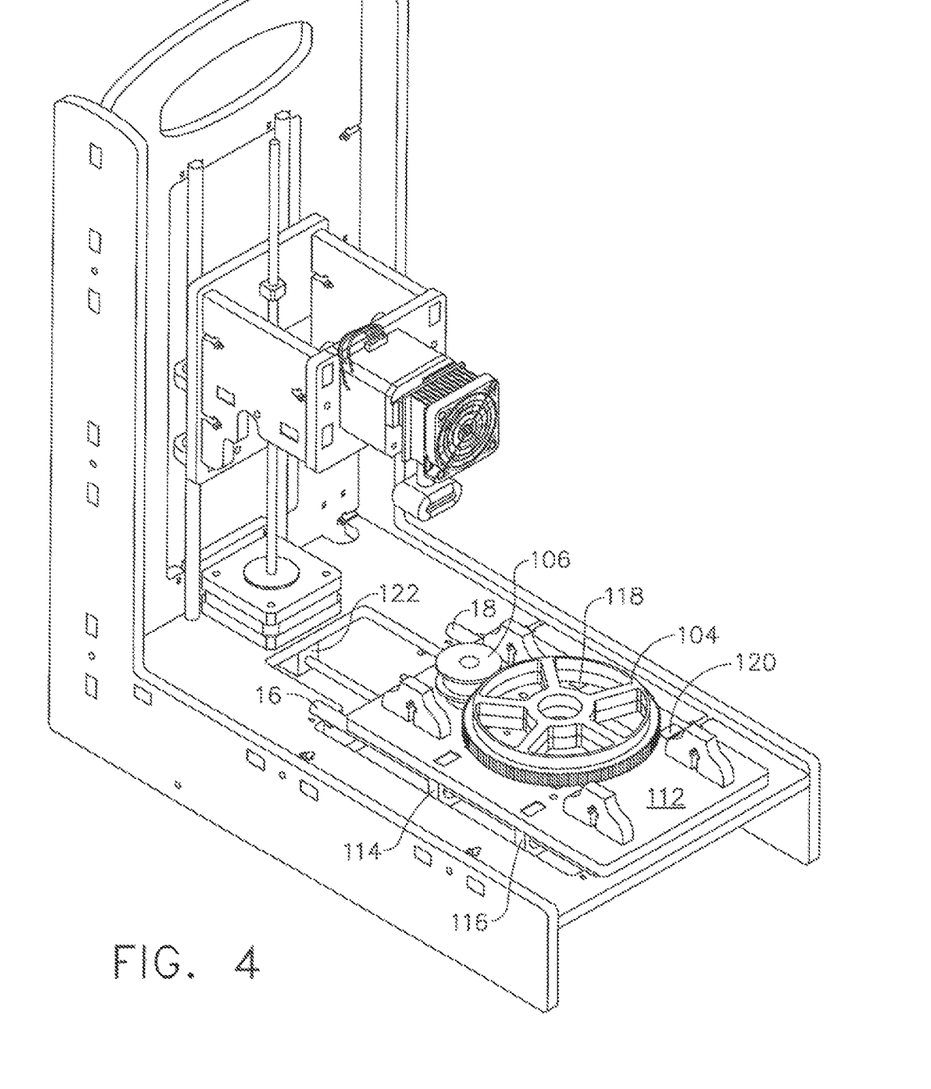
FIG. 4 shows a perspective view of the three dimensional printer of FIG. 1 with the rotatable build platform aid platform plate removed.

FIG. 4 shows a geared wheel 104 that is driven by motor 106 and upon which sits the rotatable build platform 102. The motor 106 rotates the rotatable build platform in a clockwise and counterclockwise direction, as depicted by arrows 108 and 110, respectively. The motor is typically a precision motor, such as a stepper motor or a servo motor, whose movement can be accurately controlled, typically to a resolution typically between 0.1125 and 0.05625 degrees. The motor 106 is affixed to a frame 112 that is mounted to linear bearings 114 and 116 that ride on linear guide shaft 16 and linear hearings 118 and 120 that ride on linear guide shaft 18. The linear bearings 114 and 116 and the guide shaft 16 and the linear bearings 118 and 120 and the guide shaft 18 are typically high precision components machined to tolerances of 0.008-0.016 mm to ensure positional repeatability of the rotatable build platform. FIG. 1 shows the three dimensional printer with the rotatable build platform 102 in the forward position, and FIG. 2 shows the three dimensional printer with the rotatable build platform 102 in the rearward position.

The motor 102 typically has 200 mechanical steps per revolution. Through software controls the motors move 3200 steps per revolution for more precise control. Typically, the stepper motors are run at the minimum current required for operation without stalling to reduce noise and heat buildup in the motor. Heat buildup in the motor caused by excess current can cause operation problems and the motor to shut down if the heat buildup is excessive.

The rotatable build platform 102 may be heated to improve product quality. A heated build platform improves print quality by helping to prevent warping. As extruded plastic cools, it shrinks slightly. When this shrinking process does not occur throughout a printed part evenly, the result is a warped object. This warping is commonly seen as corners being lifted off of the build platform. Printing on a heated build platform allows the printed object to stay warm during the printing process and allows more even shrinking of the plastic as it cools below melting point. Heated build platforms usually yield higher quality finished builds with materials such as ABS and PLA. A heated build platform can also assist users to print without rails.

A linear driver 122, such as a stepper motor, servo motor, or linear actuator is affixed to the support structure 10 and to the frame 112. The linear driver 122 moves the frame 112, and thereby the motor 106 and the rotatable build platform 102 in the direction of arrows 124 and 126, respectively. The linear driver 122 is typically a precision driver whose movement can be accurately controlled, typically to a resolution between 0.002 mm and 0.004 mm.

The print head 202 is mounted to a sliding support 204 that moves the print head up and down in a vertical direction as depicted by arrows 206 and 208. At least one vertical guide shaft 210 is mounted to the vertical section 14 of the support structure 10. Alternatively, the at least one vertical guide shaft 210 may be mounted to the support structure 10, thereby eliminating the need for the vertical section 14. A second vertical guide shaft 212 may also be used. The sliding support 204 along with the print head 202 are moved up and down in the direction of arrows 206 and 208 by a driver 232. The driver 232 may be a stepper motor, servo motor, or linear actuator is affixed to the support structure 10 and to the sliding support 204. The driver 232 is typically a precision driver whose movement can be accurately controlled, typically to a resolution between 0.002 mm and 0.004 mm. Here, the driver 232 is a stepper motor that rotates a threaded rod 234. The threaded rod 234 passes through a complimentary nut 236 for moving the sliding support 204 in the direction of arrows 206 and 208. The driver can typically move the support in increments between 0.05 mm and 0.35 mm. With a small incremental movement, a higher resolution part is produced at a slower speed; whereas with a large incremental movement, a lower resolution part is produced at a higher speed. Shown here is a printer with one print head 202, and multiple print heads may also be used.

The sliding support 204 has linear bearings 214 and 216 that ride on vertical guide shaft 210 and linear bearings 218 and 220 that ride on vertical guide shaft 212. The linear bearings 214 and 216 and the guide shaft 210 and the linear bearings 218 and 220 and the guide shaft 212 are typically high precision components machined to tolerances of 0.008-0.016 mm to ensure positional repeatability of the rotatable build platform.

Figure 5:
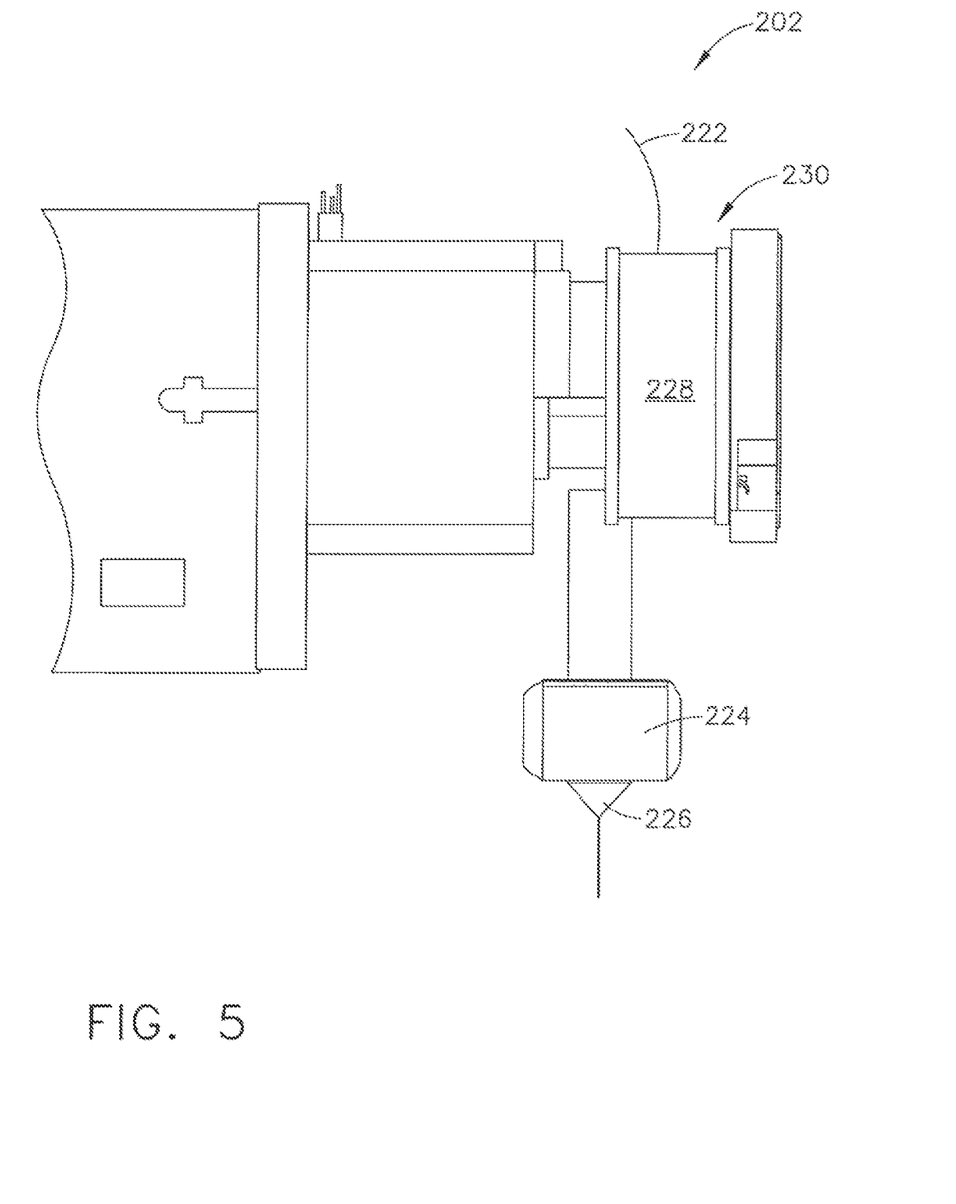
FIG. 5 shows a side view of a print head of the three dimensional printer of FIG. 1.

Referring to FIG. 5, the print head 202 has a nozzle 224 that heats a filament 222 and turns on and off the flow of the melted plastic. The plastic is laid down on the rotatable build platform to build a component. Other types of materials and print heads may also be used. For example, the print head may utilize a laser to sinter granular materials placed on the build platform to create a component using selective laser sintering or to melt granular materials on the build platform to create a component using selective laser melting. Additionally, the print head may include an electron beam for melting granular materials on the build platform to create a component using electron beam melting. Alternatively, the print head may be an inkjet system that prints a binder on a granular material on the build platform to create a component.

In operation, a plastic filament 222 is loaded into the print head 202. Typically, the filament is stored on a roll and pulled from the roll as it is consumed by the print head. A tip 226 of the print head is positioned about 0.25 mm above the rotatable build platform 102. The plastic filament 222 is melted by a heater 228 located inside a module 230 of the print head. The melted plastic is extruded from an aperture 0.2 to 0.5 mm in diameter located in the tip of the print head, typically at a rate of between 30 mm and 60 mm per minute. The rate at which the plastic is extruded depends on a number of factors, including but not limited to desired resolution of the finished product, complexity of the finished product, and type of plastic used. Various tips may be used, each with a different size aperture to vary to size of the extruded melted plastic. If a more detailed product with higher resolution is desired, then a tip with a smaller aperture is used. If speed of production is more important than resolution or detail, then a tip with a larger aperture is used.

While the print head is extruding plastic, the rotatable build platform 102 is being moved in the direction of arrows 108 and 110 by the motor 104 and in the x direction of arrows 124 and 126 for proper placement of the extruded plastic. The build platform 102 may be rotated and moved in the x direction at the same time, or the build platform may be rotated while remained fixed in the x direction, or it may be moved in the x direction without being rotated. Once a first layer is deposited on the rotatable build platform 102, the print head 202 is moved upward in the direction of arrow 206 by the driver 232. Depending on the desired resolution, the print head moves up typically between 0.05 mm and 0.35 mm. The process is then repeated to build another layer on the first layer. The process is repeated until the desired object is complete.

Figure 6:
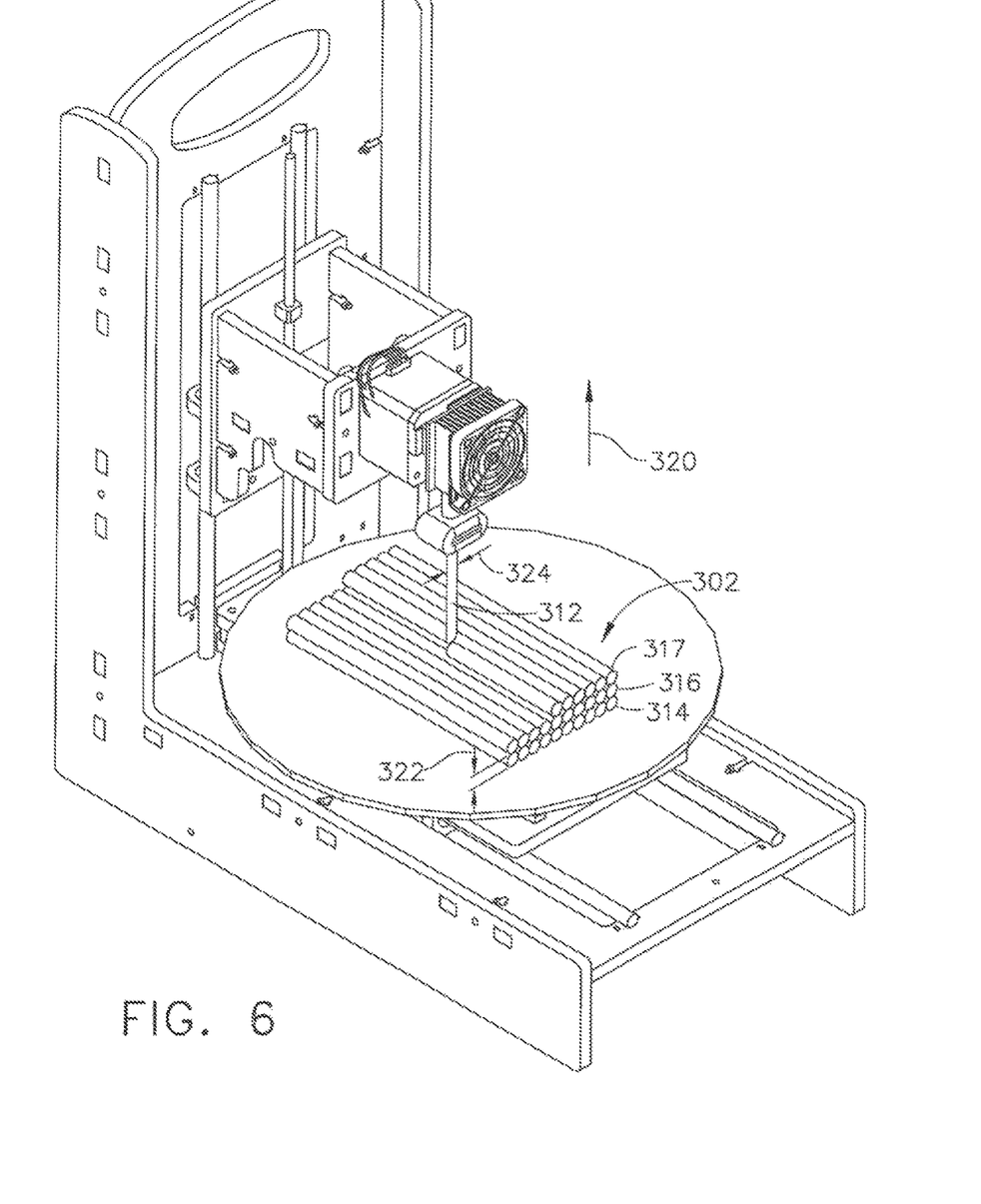
FIG. 6 shows an enlarged view of an object being printed by a three dimensional printer.

FIG. 6 shows a typical three dimensional printing additive process being used to build an object 302, the object being enlarged for clarity. The nozzle 224 having a tip 226 extrudes melted plastic 312 onto the build platform 304. Once a first layer 314 is deposited, the print head moves upward in the direction of arrow 320, typically about a distance 322 about equal to the diameter 324 of the melded plastic 312 laid down by the print bead 308. The second layer 316 is then printed. Once the second layer 316 is printed, the print bead 308 again moves upward in the direction of arrow 320 and a third layer 317 is started. The process is repeated until all layers required to complete the object are printed.

Figure 7:
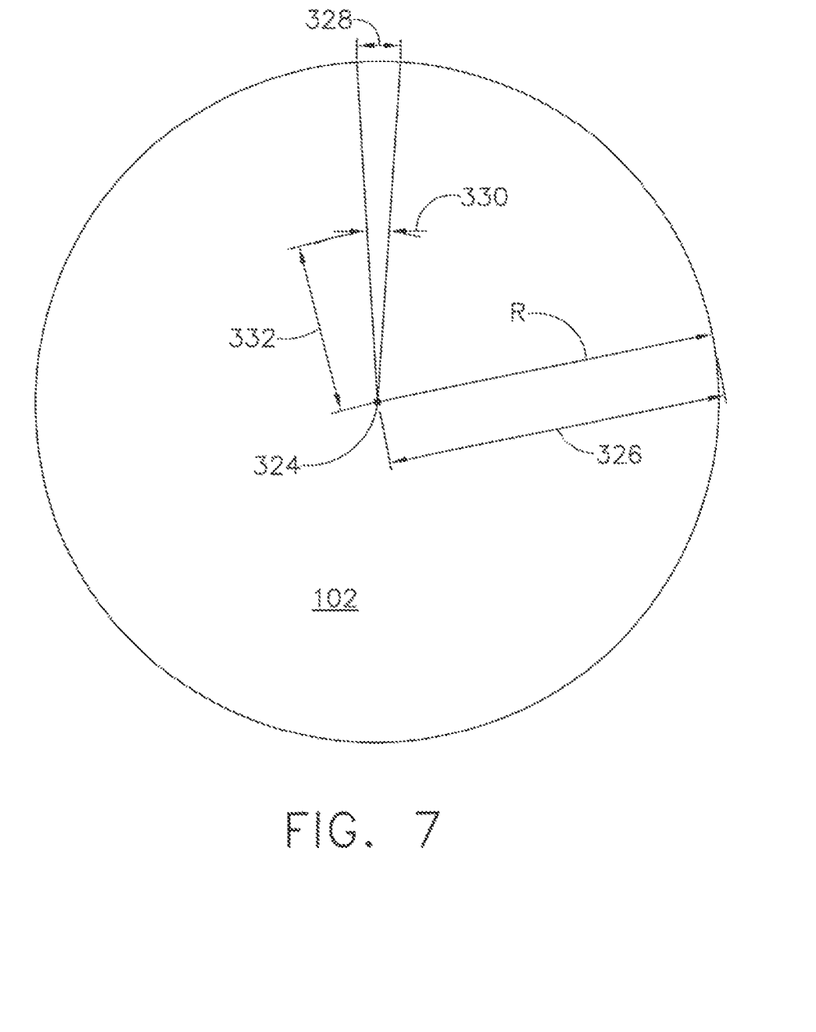
FIG. 7 shows the rotatable build platform.

A computer operating specialized software drives the three dimensional printer. When calculating the location of an object to be printed and the location at which to print to generate an object on a rotatable build platform, a polar coordinate system is employed. The specialized software optimizes the operation and movement of the print bead 202 and the build platform 102. The optimization increases the speed and accuracy of the printing process. FIG. 7 shows a drawing of the build platform 102 having a radius R with a dimension 326. Typically, the distance the build platform should move between points where the print head deposits melted plastic is about 0.002". As one would appreciate from FIG. 7, greater rotation of the build platform 304 is required to rotate the build platform 0.002" when measuring a distance 330 equal to 0.002" at a distance ½ R (332) from the center 324 than when measuring a distance 328 equal to 0.002' at a distance R from the center 324. In other words, to move a given distance of 0.002", the build platform must be rotated more the closer to the center 334 of the build platform object is. The stepper motors allow the three dimensional printer to know where the center of the build platform is located relative to the print head at any given time. When determining the how much to rotate or slide the build platform, one variable that the algorithm takes into account is the known distance from the center of the build platform to the print head at a given time. By knowing that distance, the motor can be stepped the proper amount to steps to rotate the build platform so that the build platform rotates 0.002" relative to the print head, whether the print head is located ¼ of the radius from the center, ½ radius from the center, ¾ radius from the center, substantially one radius from the center, or any distance therebetween.

Another way to optimize the movement of the build platform is to fix an initial minimum angle that the build platform 102 will rotate when printing an object, for example 1 minute. By way of example, the 1 minute minimum angle is determined based on a required resolution, say 0.002" at a distance equal to the radius R of the build platform. While 0.002" is used in this example, other distances may be chosen, depending in part, on the desired resolution and print speed. When printing, the software evaluates the distance from the center 328 to the tip 226 of the nozzle 224 and determines the distance the build platform will move when measured at the tip of the nozzle if the build platform is rotated 1 minute. If the distance is less than 0.002", then the software skips printing at the point where the build platform is totaled 1 minute. The software then does the above calculation to assess whether the distance will be less than 0.002" if the build platform is rotated 2 minutes. If the distance is less than 0.002", then the software skips printing at the point where the build platform is rotated 2 minutes and does the same calculation for rotating the build platform 3 minutes. Alternatively, if the distance is greater than 0.002", then printing occurs. The iterative process is continued until the distance is greater than 0.002", at which time printing occurs. As shown by this example, the closer to the center the object is being printed, the more rotation steps that will be skipped in order to maintain the desired 0.002" resolution. If printing was not skipped when the distance was less than 0.002", then resolution of the object would be difficult to maintain because typically a fixed amount of material, is laid down at each point. As such, material in excess of the amount needed for 0.002" resolution would be laid down, resulting in a blob like structure with reduced resolution.

To control the current, potentiometers are typically used to adjust the current provided to the motor. Alternatively, to allow for automatic adjustment of the current, digital potentiometers, also known as digipots, may be used. Digipots can be controlled by a computer.

If too small of a current is used to drive the build platform, then the inertia of the rotating build platform can cause the build platform to skip past a step in the motor. Thus, adjusting the current based on the inertia of the build platform can be done to optimize the current, with less current being used when the inertia is low and more current being used when the inertia is higher.

Among the factors to be considered to determine the inertia of the build platform during the build process include the mass of the build platform, the location of the item being printed on the build platform, the total mass of the item being built and the mass of the item being built at a particular time during the build process. By way of example, an object having a mass M will generate less inertia in the build platform when located a distance equal to one—half the radius R (½R) 332 from the center 334 than an object of the same mass located a distance equal to the radius R 320 from the center 334 (FIG. 7). And an object having twice the mass (2M) will generate more inertia than another object having a mass (M) when each is located the same distance from the center 334.

To optimize the current required, the algorithm determines the location at which the object will be built and the mass of the partially built object at various times during the building process. Typically, the total duration of time required to build the object is divided by a predetermined number, for example 10. But other predetermined numbers may be used, with a higher number typically providing a greater degree of optimization than a lower number. Returning to the example, if the total build time is 60 minutes, that time is divided by 10. For each predetermined 6 minute period, the maximum inertia is calculated using the total mass of material deposited during the 6 minute period, the mass of the build platform, and the location of the built object. The algorithm calculates the maximum inertial of the build platform occurring during that first 6 minute period and calculates the minimum current required to prevent stalling the motor during that first 6 minute period. The controller output adjusts the digipots to drive the motor 106 to the minimum current required during that first time period. As the mass of the object increases during the second and each subsequent predetermined time period, the moment of inertia increases and thus, the current requirement increases. Thus, when calculating the required minimum current for the second time period, the mass of the structure at the end of the second time period is used. And when calculating the required minimum current at the end of each subsequent time period, the mass of the structure at the end of that subsequent time period is used.

The algorithm may calculate the current requirements for each of the periods prior to starting the printing operation, or it may calculate the current requirement for the first time period, start printing, and while printing during the first time period calculate the current requirements for the second and subsequent time periods.

While the optimization based on inertia calculations in the embodiment above relates to a rotatable build platform, it is also relevant to other primer applications. For example, inertia calculations based in part on the mass of an object being printed could also be used to optimize movement of an x-y moving build platform. Additionally, inertia calculations based in part on the mass of a print head could be used to optimize movement of a print head that moves in the x, x-y, or x-y-z direction.

The slideable rotatable build platform could also be used with other apparatuses. For example, a scanner could be substituted for the print head. In one embodiment, the print head could be unplugged and a scanner head could be installed in place of the print head. In another embodiment, a scanner head could be located on, with, or next to the printer head so that physically removing a print bead and installing a scanner head is not required. A scanner head could be used to scan and store the geometries of an object to be replicated. To replicate an object, the scanner scans the geometries of the object and that information is downloaded to a computer. The computer then generates the virtual model of the object creates the necessary file for printing a replica of the object. Additionally, a scanner head could be used to verity that an object has been primed accurately. To verify accuracy, a scanner head could scan the geometries of a printed object and download the information to a computer. The computer compares the geometries of the printed object with the virtual model used to print the object to check for errors.

While particular embodiments of the invention have been described, the invention cars be further modified within the spirit and scope of this disclosure. This application is therefore intended to cover any variations, uses or adaptations of the invention using its general principles. Further, the application is intended to cover such departures from the present disclosure as come within known or customary practice in the art to which this invention pertains and which fail within the appended claims.

I claim:

1. A method for printing a three dimensional object comprising:
   a. providing a support structure, a rotatable build platform having a center and disposed on the support structure, and a print head,
   b. calculating a distance of an object from the center of the rotatable build platform,
   c. rotating the build platform,
   d. slideably moving the build platform disposed on the support structure, and
   e. printing the object on the build platform with the print head.

2. The method according to claim 1, wherein the printing step comprises extruding a plastic.

3. The method according to claim 1, further comprising moving the print head away from the build platform a predetermined distance and extruding a second layer on a first layer of extruded plastic.

4. The method according to claim 1, wherein the steps of rotating and sliding are performed concurrently.

5. The method according to claim 1, where the steps of rotating, sliding, and printing are performed concurrently.

6. The method according to claim 1, further comprising calculating the inertia generated by the build platform and a partially printed object.

7. The method according to claim 6, further comprising providing a driver for rotating the build platform and adjusting a drive current for the driver according the calculated inertia generated by the build platform and the partially printed object.

8. The method according to claim 7, wherein a polar coordinate system is used to calculate the distance of the object from the center of the rotatable build platform.

9. The method according to claim 1, further comprising rotating the build platform an angle, wherein the angle is based on a desired resolution and the distance of the object from the center of the rotatable build platform.

10. The method according to claim 1, further comprising comparing a desired resolution to the distance the rotatable platform will move relative to a tip of a nozzle of the print head when the rotatable build platform is rotated a given angle.

11. The method according to claim 10, further comprising skipping a printing step and rotating the build platform twice the given angle if the desired resolution is greater than the distance the rotatable platform will move relative to a tip of a nozzle when the rotatable build platform is rotated the given angle.

12. The method of claim 1, wherein the build platform moves slidably in a linear direction in a horizontal plane.

13. A method for printing a portion of a layer of a three dimensional (3D) object comprising:
   a. providing a support structure, a rotatable build platform having a center and disposed moveably on the support structure, and a print head including a nozzle having an extrusion tip;
   b. moving the build platform in a horizontal plane, relative to the extrusion tip of the nozzle, including at least one or both of rotating the build platform a given angle and sliding the build platform a given distance in a linear direction;
   c. extruding a melted plastic through the extrusion tip while moving the build platform relative to the extrusion tip, for printing a portion of a layer of an object on the build platform; and
   d. during a step of moving that consists of rotating the build platform the given angle with the extrusion tip positioned at a distance from the center of the rotatable build platform that is calculated using a polar coordinate system, skipping an extruding step and rotating the build platform twice the given angle if a desired resolution of the three dimensional object is greater than a distance the rotatable platform will move, relative to the extrusion tip, when rotated the given angle.

14. The method according to claim 13, further comprising providing a driver for rotating the build platform, calculating the inertia generated by the build platform and a partially printed object, and adjusting a drive current for the driver according the calculated inertia generated by the build platform and the partially printed object.

15. The method according to claim 13 for printing an additional layer of the 3D object, further comprising moving the print head vertically away from the build platform a predetermined distance, and printing a portion of a second layer on a first layer of the object.

* * * * *

UNITED STATES PATENT AND TRADEMARK OFFICE
CERTIFICATE OF CORRECTION

PATENT NO. : 9,527,272 B2
APPLICATION NO. : 14/200253
DATED : December 27, 2016
INVENTOR(S) : William Joseph Steele It is certified that error appears in the above-identified patent and that said Letters Patent is hereby corrected as shown below:

In the Specification

Column 1, Line 51, delete "bead" and insert --head--.

Column 2, Line 11, delete "aid" and insert --and--.

Column 2, Line 40, delete "hearings" and insert --bearings--.

Column 3, Line 3, delete "rails" and insert --rafts--.

Column 3, Line 41, delete "hearings" and insert --bearings--.

Column 4, Line 35, delete "bead" and insert --head--.

Column 4, Line 37, delete "bead" and insert --head--.

Column 4, Line 46, delete "bead" and insert --head--.

Column 5, Line 20, delete "totaled" and insert --rotated--.

Column 5, Line 60, delete "320" and insert --326--.

Column 6, Line 34, delete "primer" and insert --printer--.

Column 6, Line 55, delete "verity" and insert --verify--.

Column 6, Line 55, delete "primed" and insert --printed--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,527,272 B2

Column 6, Line 62, delete "cars" and insert --can--.

Column 7, Line 2, delete "fail" and insert --fall--.